United States Patent
Berne

(10) Patent No.: US 11,611,712 B2
(45) Date of Patent: Mar. 21, 2023

(54) METHOD CONSISTING IN USING AT LEAST ONE VEHICLE CAMERA TO CHECK WHETHER CERTAIN ELEMENTS OF THE VEHICLE ARE IN A SAFE CONDITION BEFORE STARTING OFF

(71) Applicant: Volvo Lastvagnar AB, Gothenburg (SE)

(72) Inventor: Nicolas Berne, Heyrieux (FR)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 16/641,476

(22) PCT Filed: Sep. 6, 2018

(86) PCT No.: PCT/EP2018/074050
§ 371 (c)(1),
(2) Date: Feb. 24, 2020

(87) PCT Pub. No.: WO2019/048567
PCT Pub. Date: Mar. 14, 2019

(65) Prior Publication Data
US 2021/0160433 A1    May 27, 2021

(51) Int. Cl.
*G06T 7/60* (2017.01)
*H04N 5/247* (2006.01)
(Continued)

(52) U.S. Cl.
CPC ............. *H04N 5/247* (2013.01); *B60R 1/002* (2013.01); *G01C 21/3461* (2013.01);
(Continued)

(58) Field of Classification Search
CPC ... B60R 1/00; B60R 1/025; B60R 2300/8046; B60R 11/04; B60R 1/007; H04N 5/2353;
(Continued)

(56) References Cited

U.S. PATENT DOCUMENTS 5,980,048 A * 11/1999 Rannells, Jr. ........... B60R 1/025
180/167
2008/0009990 A1* 1/2008 Katoh ................ B62D 15/0285
701/36
(Continued)

FOREIGN PATENT DOCUMENTS

DE    10 2011 113323 A1    5/2012
EP         2249532 A2       11/2010

OTHER PUBLICATIONS

Eike et al.( "Final Report Camera-Monitor Systems as a Replacement for Exterior Mirrors in Cars and Trucks," rederal Highway Research Institute, Jan. 22, 2015, 91 pages) (Year: 2015).*
(Continued)

*Primary Examiner* — Masum Billah
(74) *Attorney, Agent, or Firm* — Withrow & Terranova, PLLC

(57) ABSTRACT

The invention concerns a method consisting in using at least one vehicle camera (8, 10, 12) to automatically check whether certain elements of the vehicle (2) are in a safe condition before starting off and in informing the driver of the check results, for example by displaying the check results on the vehicle dashboard.

13 Claims, 3 Drawing Sheets

(51) Int. Cl.
  *H04N 5/232* (2006.01)
  *B60R 1/00* (2022.01)
  *G01C 21/34* (2006.01)
  *G06T 7/00* (2017.01)
(52) U.S. Cl.
  CPC .............. *G06T 7/0002* (2013.01); *G06T 7/60* (2013.01); *H04N 5/23299* (2018.08); *B60R 2300/105* (2013.01); *B60R 2300/20* (2013.01); *G06T 2207/30252* (2013.01)
(58) Field of Classification Search
  CPC ........... H04N 5/232123; H04N 5/2254; H04N 5/23293; H04N 5/232; H04N 5/23209; H04N 5/232122; H04N 5/23245; H04N 9/04557
  USPC ......................................................... 348/135
  See application file for complete search history.

(56) References Cited

U.S. PATENT DOCUMENTS

| | | | | |
|---|---|---|---|---|
| 2009/0225161 A1* | 9/2009 | Otani | ..................... | G01C 11/12 348/135 |
| 2010/0222992 A1* | 9/2010 | Leblanc | ................. | B60K 28/04 701/113 |
| 2014/0297128 A1* | 10/2014 | Lavoie | ............ | B60W 30/18036 701/41 |
| 2016/0098604 A1* | 4/2016 | Min | ........................ | B62D 13/06 382/104 |
| 2016/0217332 A1* | 7/2016 | Park | ........................ | G06V 20/56 |
| 2018/0045823 A1* | 2/2018 | Prasad | ..................... | G01S 13/42 |
| 2018/0285689 A1* | 10/2018 | Mei | ....................... | G06K 9/6256 |
| 2018/0356245 A1* | 12/2018 | Schein | ............... | G01C 21/3664 |

OTHER PUBLICATIONS

International Search Report and Written Opinion for International Patent Application No. PCT/EP2017/072500, dated May 29, 2018, 9 pages.
Eike et al., "Final Report Camera-Monitor Systems as a Replacement for Exterior Mirrors in Cars and Trucks," Federal Highway Research Institute, Jan. 22, 2015, 91 pages.
International Search Report and Written Opinion for International Patent Application No. PCT/EP2018/074050, dated Dec. 6, 2018, 10 pages.

* cited by examiner ically the necessary checks each time the vehicle is
METHOD CONSISTING IN USING AT LEAST ONE VEHICLE CAMERA TO CHECK WHETHER CERTAIN ELEMENTS OF THE VEHICLE ARE IN A SAFE CONDITION BEFORE STARTING OFF This application is a 35 USC 371 national phase filing of International Application No. PCT/EP2018/074050, filed Sep. 6, 2018, which claims priority to International Application No. PCT/EP2017/072500, filed Sep. 7, 2017, the disclosures of which are incorporated herein by reference in their entireties.

BACKGROUND

The present invention concerns a method consisting in using at least one vehicle camera to check whether certain elements of the vehicle are in a safe condition before starting off.

SUMMARY

Normally, any driver is supposed to check safety aspects before driving. Typically, the driver must complete a walk-around to check, for example, that the rear door is well locked, that the tires are not flat, that the wheels each have the appropriate number of screws, etc. However, in most of the cases, the driver does not perform these checks. Such negligence may lead the driver to discover that one or more elements of the vehicle are not in a safe condition while driving or, in the worst case, to failure(s) that could have been avoided.

In the automotive industry, the trend is to equip the vehicles with onboard cameras for replacing the traditional outside mirrors. Indeed, a camera has significantly less windage than an outside mirror and helps then improving the aerodynamic behavior of the vehicle. Further, infrared cameras provide the driver with an enhanced vision in dark surroundings. Also, cameras are being used increasingly in the blind spot information systems, in the back-up assist systems of the vehicles and in the autonomous vehicles.

The idea is then to use one or more vehicle cameras to perform the necessary checks in lieu of the driver.

To this end the invention concerns a method according to claim 1.

EP 2 249 532 relates to a method for assisting a driver of a commercial vehicle. In particular, EP 2 249 532 discloses a tractor comprising, on each outer side, an outwardly projecting camera arm. Each camera arm has a first camera directed backwards in a longitudinal direction of the vehicle and a second camera, which is directed obliquely downwards. The first camera is connected to an image processing device by means of which some characteristics of the tractor and of the trailer can be extracted. For example, the length and/or the height of the trailer can be determined thanks to the image processing device. This arrangement therefore ensures a particularly simple and reliable way to determine the height of the trailer relative to the tractor.

It is then known to use the vehicle cameras to carry out measurements of size of the vehicle. However, such measurements are not performed before the vehicle starts off. Further, EP 2 249 532 is silent about the use of vehicle cameras to check certain elements of the vehicle, such as the status of the tires, before starting off.

Thanks to the invention, the vehicle cameras perform automatically the necessary checks each time the vehicle is started; i.e. the cameras capture images that are processed to determine whether certain key elements of the vehicle are in a safe condition or not. Basically, the images captures by the camera(s) may help checking that the tires are in a safe condition (no loss of pressure, no bumps or bulges, etc.). Accordingly, if one or more elements of the vehicle are not in a safe condition, the driver is alerted before driving off. This helps avoiding the occurrence of future failure(s) while driving, meaning that the safety is increased. Further, the driver does not have to complete a walk-around to ensure that the vehicle is in good condition, providing a gain of time.

Further advantageous features of the method are defined in claims 2 to 11.

BRIEF DESCRIPTION OF THE DRAWINGS

The invention will be better understood from reading the following description, given solely by way of one non-limiting example and with reference to the appended drawings, which are schematic depictions, in which.

DETAILED DESCRIPTION

Figure 1:
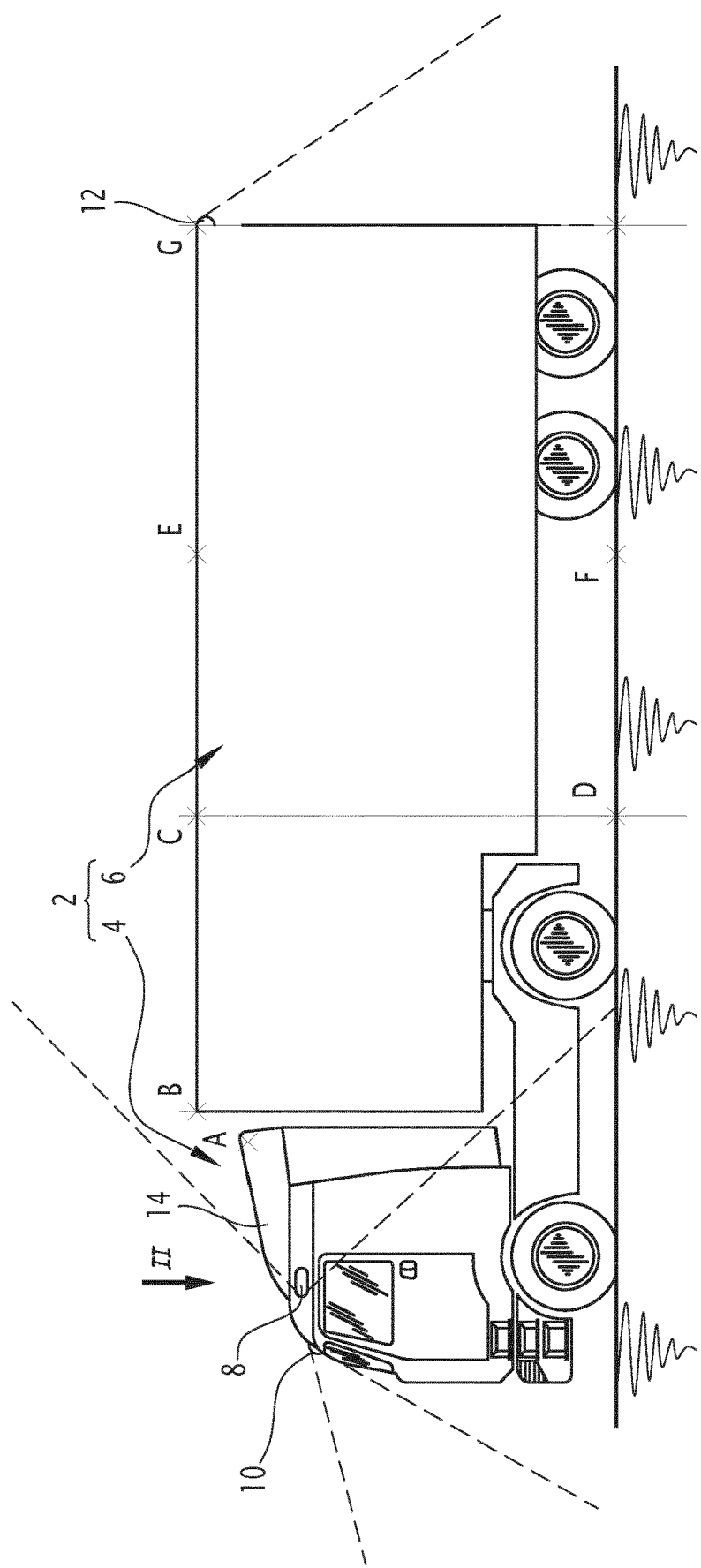
FIG. 1 is a side view of a heavy-duty vehicle, in particular a truck, comprising two side cameras replacing outside mirrors.

FIG. 1 represents, in side view, a vehicle which is, in the example, a truck 2.

However, in a non-represented alternative embodiment, the vehicle may be different from a truck. For instance, the vehicle may be a light-duty vehicle, a utility vehicle, an autonomous vehicle, etc.

The truck 2 includes a towing vehicle 4 and a trailer 6.

Figure 2:
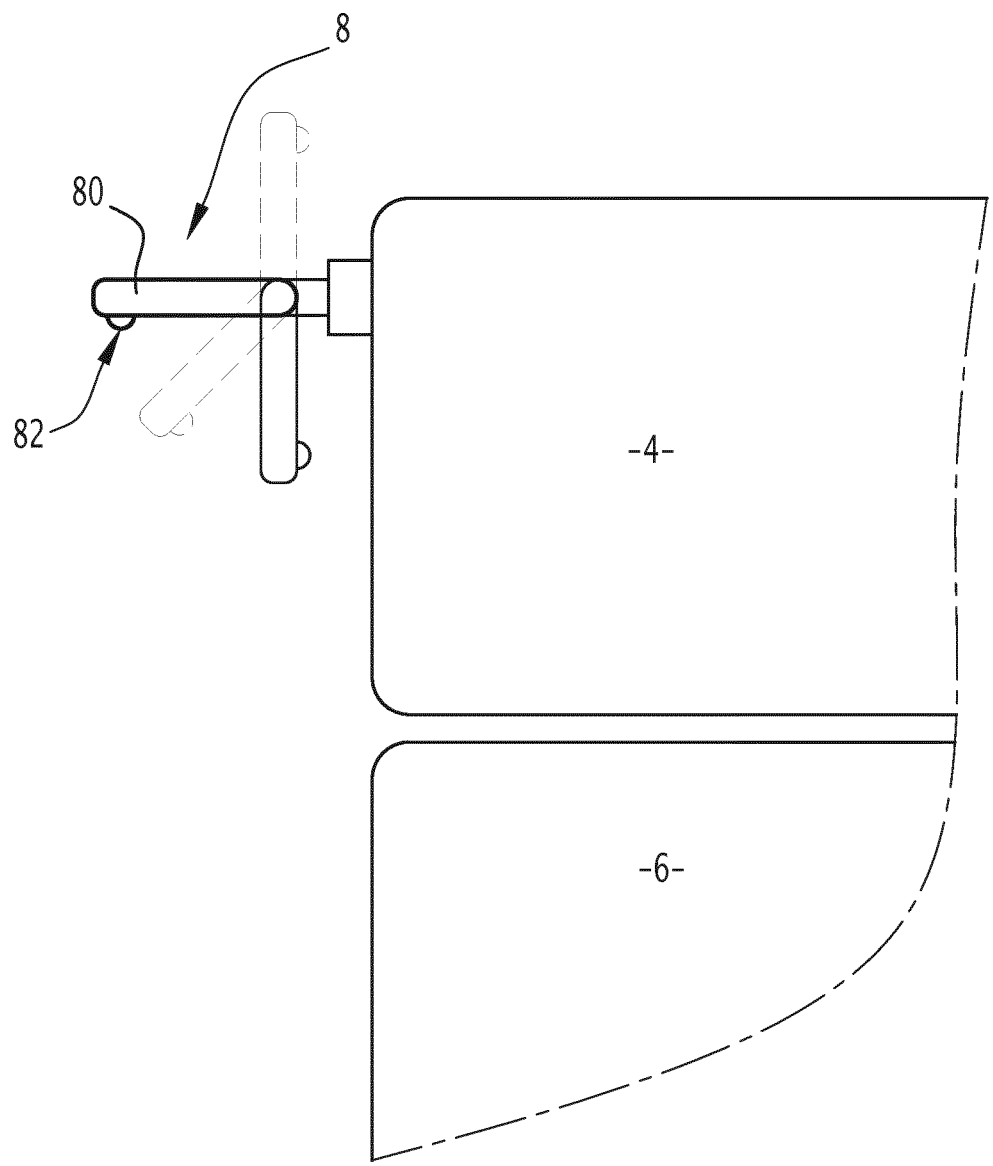
FIG. 2 is an enlarged view along arrow II of FIG. 1.

The vehicle 2 includes at least one camera, which can also be referred to as a Camera Monitoring System (CMS). In the example, the vehicle 2 is equipped with two rear-facing side cameras 8 replacing outside mirrors, a rearview camera 12 and a front view camera 10. Typically, and as shown on FIG. 2, each side camera 8 includes a camera arm 80 at the end of which is provided the camera body lens 82. The camera arm 80 is movable in rotation around a vertical axis, meaning that the two side cameras 8 are foldable. In particular, the two side cameras 8 are movable between a rest position, represented in thin line, wherein they are retracted against the cabin wall and a driving position, represented in thick line, wherein they extend substantially in the width direction of the truck. In the driving position, the side cameras 8 provide the driver with the legal field of vision.

Advantageously, the truck includes an actuator (not represented) for unfolding the side cameras 8 when the vehicle is started and for folding the cameras 8 when the vehicle is parked. Said actuator is known from prior art, that is why it is not described in detail.

Preferably, one or more screens (not represented) may be arranged inside the truck cabin to display the images recorded by the vehicle cameras.

The method of the invention consists in using at least one vehicle camera (onboard camera), typically the cameras 8, 10 and 12, to automatically check whether certain elements of the vehicle are in a safe condition before starting off and in informing the driver of the check results, for example by displaying the check results on the vehicle dashboard (not represented).

In the meaning of the invention, the step of checking whether certain elements of the vehicle are in a safe condition includes all of the checks that the driver needs to do before going on open road. It includes checking that there are:

no lights or signaling malfunction; no visible damage on tires;
no flat tires;
no safety parts missing;
no visible damage on the vehicle.

Advantageously, all of the safety checks are performed automatically as no action from the driver is required.

In particular, the screen of the dashboard may display custom messages, in particular text messages, to inform the driver of the check results. Typically, custom messages may be displayed to inform the driver that one or more elements of the vehicle are not in safe condition.

Said certain elements include one or more of the following elements:

the rear door locking mechanism,
the wheels,
the vehicle body, including for example the front end and the rear end,
the tires,
the side bars (protections) on trailer sides,
the lighting (back and/or front),
the suspensions.

For example, the rearview camera 12 may be used to check the status of the rear door locking mechanism, i.e. to check that the rear door is correctly locked. Also, the rearview camera 12 and/or the front camera 10 may be used to check potential damage or failure on lighting. The two side cameras 8 may be used to check that the wheels each have the correct number of screws on the wheels, body damage, loss of pressure on the tires, damage on side of tires (bumps, bulges), damages on side bars (not represented) on trailer sides, potential defects on the suspensions, etc.

Typically, the vehicle cameras may also help to check the front and rear sides of the vehicle, as well as the sides of the trailer 6. In particular, the vehicle cameras 8 may check whether the trailer sheet is ripped.

Figure 3:
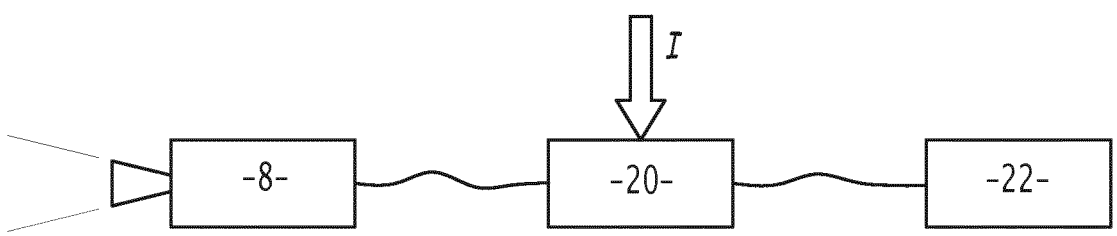
FIG. 3 is a schematic depiction representative of how the images captured by the vehicle cameras are processed to implement the method of the invention.

In the example, the checking step as such is performed by an image processing device 20, represented schematically on FIG. 3, and capable of comparing the images captured by the cameras with comparable images stored in memory and representative of the vehicle in the original unused condition.

Let us take for the understanding the example of a lamp 24 provided at the back of the vehicle 2. In practice, and as shown on FIG. 4, the cameras 8 record images on which one can observe the status of the rear lamps 24.

Figure 4:
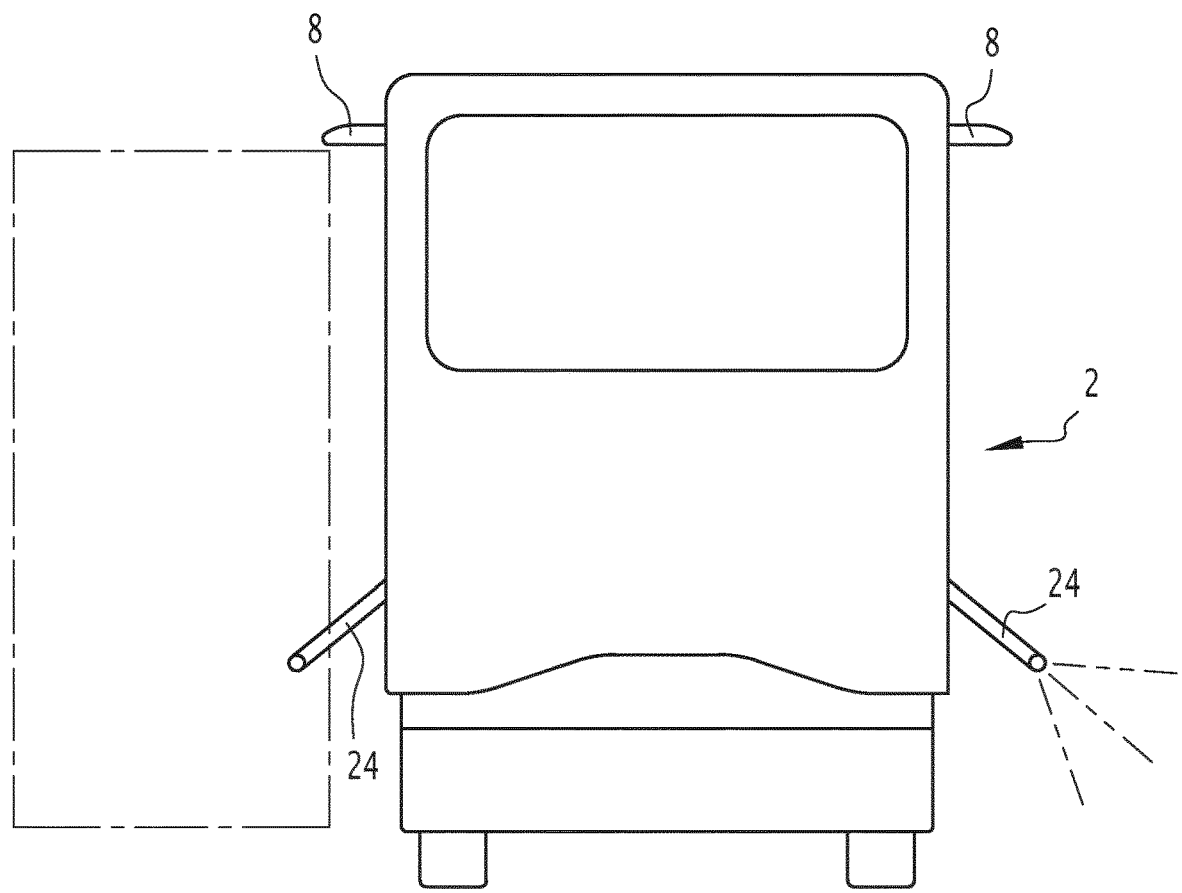
FIG. 4 is a front view of the vehicle of FIGS. 1 and 2, also showing the field of view of a camera towards the rear of the vehicle.

Typically, on FIG. 4, the field of view of the right camera 8 (side opposite the driver when considering a vehicle designed to drive on the right) is represented by an interrupted line frame.

Figure 6:
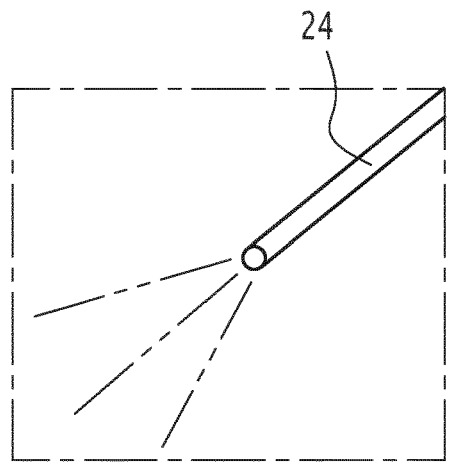

The information, i.e. the video data, is sent to the image processing device 20, which is nothing but an electronic control unit (ECU). The images are then compared to one or more pre-recorded images, such as the one depicted on FIG. 6, wherein the lamp 24 is turned on. Pre-recorded images are input information I (See FIG. 3) for the image processing device (or ECU) 20.

Figure 5:
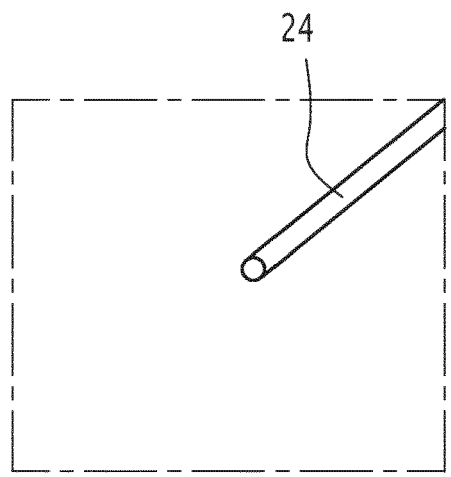
FIG. 5 is an enlarged view of one area of the field of view of the camera, and FIG. 6 a pre-recorded image to which the picture captured by the camera may be compared in order to detect a malfunction.

A pixel-by-pixel comparison enables the image processing device 20 to determine whether the lamp 24 is turned on or off. Precisely, in the depicted example, the recorded data (FIG. 5) do not match with pre-recorded data (FIG. 6), meaning that the lamp 24 is malfunctioning because it should normally be on. Preferably, the information is transmitted to a Human-machine interface (HMI) 22 so as to inform the driver of the malfunction.

For example, the HMI 22 may be a display screen, preferably the central display screen of the vehicle provided on the vehicle dashboard.

Typically, the HMI 22 may display a message asking the driver to check the condition of the lamp. Alternatively, this can be a pop up in the instrument cluster or a specific sound or an overlay in CMS screen.

Inversely, if recorded data match with the pre-recorded data, this means that both images show a lamp that is turned on, and then there are no malfunction. In this case, nothing is sent to the HMI 22. Alternatively, the HMI 22 may inform the driver that the rear lamp(s) 24 function a priori correctly.

Preferably, each time the vehicle is started, the two side cameras 8 move from the rest position to an intermediate position (represented with broken lines on FIG. 2), wherein the captured images serve to check whether certain elements of the vehicle are in a safe condition.

Preferably, after a predetermined period has elapsed since the cameras have reached the intermediate position, the cameras 8 move from the intermediate position to the driving position. For example, the predetermined period may be of 10s.

Therefore, the intermediate position can also be referred to as a checking position. Typically, the side cameras 8 leave their rest position when at least one of the following conditions is fulfilled:

the engine is being turned on;
the parking brake is being released;
the throttle is being depressed
a speed gear ratio is engaged.

Alternatively, the side cameras 8 move from the rest position to the intermediate position when the engine is being turned on, i.e. at the ignition, and from the intermediate position to the driving position when the parking brake is being released or when the throttle is being depressed or when a speed gear ratio is being engaged.

In the example, the cameras are also used to carry out measurements of size of the vehicle before starting off. Typically, the cameras may be used to measure the length, the height and/or the width of the vehicle.

Basically, the images processing device 20 is capable of identifying reference points on the images, for example with the help of contrasts. In the example of FIG. 1, the ECU is able to process the images captured by the two side cameras 8 to identify two reference points A and B, respectively at the top of the deflector 14 and at the top of the trailer 6.

If, as in the example of FIG. 1, the two reference points A and B are not detected as being at the same height, this means that the roof deflector 14 is too low. The corresponding information can be sent to the driver via the HMI unit 22 and the driver may adjust the roof deflector 14 accordingly.

Also, the ECU 20 is able to process the images captured by the two side cameras 8 to identify two pairs of reference points C, E and D, F, respectively at the top of the trailer 6 and at the level of the ground. Accordingly, the ECU 20 can calculate the height of the trailer 6 by measuring the distance between the points C and D or E and F. Further, the ECU 20 advantageously checks whether the distance CD is identical to the distance EF so as to confirm that the measured distance is right. This double check enables improving the measure of the height of the trailer 6, and thus of the truck 2 as the towing vehicle 4 is less high.

A comparable process can be implemented to measure the length of the trailer 6 attached to the towing vehicle 4. Typically, the ECU 20 is able to process the images captured by the two side cameras 8 to identify two reference points B and G, respectively at the front end of the trailer 6 and at the back end of the trailer 6. The ECU 20 can then calculate the length of the trailer 6 by measuring the distance between the points B and G.

The length of the towing vehicle 4 can be stored in a memory, integrated into or deported from the ECU 20. Accordingly, it is possible to calculate the total length of the truck by adding the known length of the towing vehicle 4 with the measured length of the trailer 6. The information can then be sent to the driver via the HMI 22.

Preferably, the images that serve to carry out the measurements of size may be 15 captured when the two side cameras 8 are in the intermediate, or checking position.

Advantageously, the measurements of size of the vehicle that have been obtained through the images captured by the cameras are considered when calculating a route.

Besides, at least one vehicle camera, typically the two side cameras 8, may be used to measure the height of the trailer 6 for the purpose of adjusting the angle of a roof deflector 14.

In a non-represented alternative embodiment, the front camera 10 and the rearview camera 12 are also movable between a rest position (or parking position) and a driving position. Also, an intermediate position (or checking position) may be provided to capture images that will serve to check whether some elements of the vehicle are in safe condition and/or to carry out size measurements.

Alternatively, at least one of the side cameras 8 include a movable arm that is pivotable around approximately 180° so as to be able to capture images of the front of the truck. This means that the camera arm can move further to the driving position, and can reach a position (that is represented with dotted lines on FIG. 2) forming an angle of 90° relative to the driving position. In such configuration, the front view camera 10 is not necessary.

The features of the method and of non-represented alternative embodiments may be combined together to generate new embodiments of the invention.

The invention claimed is:

1. A method, comprising:
   receiving, by a processing device prior to driving a vehicle, at least one image of at least a portion of the vehicle captured by at least one vehicle camera of the vehicle;
   processing, by the processing device prior to driving the vehicle, the at least one image to automatically determine whether predetermined certain elements of the vehicle are in a predetermined safe condition, comprising measuring a distance between at least two reference points in the at least one image; and
   displaying, by the processing device prior to driving the vehicle, the determined results on a vehicle dashboard to inform a driver of the vehicle of the determined results,
   wherein measuring the two reference points in the at least one image further comprises:
   measuring a distance between a first reference point at a front end of a trailer and a second reference point at a back end of the trailer.

2. The method according to claim 1, further comprising using the at least one vehicle camera to carry out measurements of size of the vehicle before starting off.

3. The method according to claim 2, wherein the at least one vehicle camera is used to measure a length, a height and/or a width of the vehicle.

4. The method according to claim 2, comprising considering the measurements of the size of the vehicle when calculating a route.

5. The method according to claim 1, wherein, each time the vehicle is started, the at least one vehicle camera moves:
   from a rest position to an intermediate position, wherein captured images serve to check that the predetermined certain elements of the vehicle are in the predetermined safe condition, and carry out measurements of size of the vehicle, and
   from the intermediate position to a driving position.

6. The method according to claim 5, wherein the at least one vehicle camera moves from the intermediate position to the driving position after a predetermined period has elapsed since the at least one vehicle camera is in the intermediate position.

7. The method according to claim 5, wherein, each time the vehicle is started, two cameras move into the intermediate position.

8. The method according to claim 7, wherein the two cameras are foldable side cameras.

9. The method according to claim 1, comprising using two side cameras, a rearview camera, and a front view camera to check whether the predetermined certain elements of the vehicle are in the predetermined safe condition, and carry out measurements of size of the vehicle, before starting off.

10. The method according to claim 1, wherein said predetermined certain elements include at least one of:
    a rear door locking mechanism,
    wheels,
    a vehicle body,
    tires,
    side bars on trailer side,
    back lighting,
    front lighting, or
    suspensions.

11. The method according to claim 1, wherein the vehicle is a truck including a trailer, and the at least one vehicle camera is used to measure a height of the trailer to adjust a roof deflector.

12. The method of claim 1, wherein measuring the two reference points in the at least one image further comprises:
    determining a comparative height of the at least two reference points.

13. The method of claim 1, wherein the predetermined safe condition comprises at least one of:
    no lights or signaling malfunction,
    no visible tire damage,
    no flat tires,
    no missing safety parts, or
    no visible vehicle damage.

* * * * *